1
United States Patent
Eaton

[15] 3,678,717
[45] July 25, 1972

[54] COUPLING GUARD DEVICE

[72] Inventor: Randell C. Eaton, 4 Virginia Lane, Westport, Conn. 06880

[22] Filed: Nov. 27, 1970

[21] Appl. No.: 93,007

[52] U.S. Cl....................................70/232, 70/51, 285/80
[51] Int. Cl..............................E05b 73/00, F16l 35/00
[58] Field of Search..................70/232, 51, 53, 54, 55, 229, 70/DIG. 58, 212, 178, 164, 14; 339/82, 85, 87

[56] References Cited

UNITED STATES PATENTS

| | | | |
|---|---|---|---|
| 619,795 | 2/1899 | Schreiner | 70/232 |
| 725,290 | 4/1903 | Speer | 70/232 |
| 1,778,502 | 10/1930 | Levey | 70/164 X |
| 1,300,125 | 4/1919 | Comerford | 70/212 |
| 1,415,662 | 5/1922 | Levy | 70/229 |
| 2,697,929 | 12/1954 | Morgan | 70/14 |

Primary Examiner—Albert G. Craig, Jr.
Attorney—Mattern, Ware and Davis

[57] ABSTRACT

A coupling guard device for substantially enclosing and retaining a conventional hose coupling or the like and capable of being locked in such enclosing and retaining relation to prevent unauthorized tampering with or disengagement of the coupling. In one embodiment, the guard comprises a flanged U-shaped guard member having slots in its side legs arranged to allow a retaining member to be engaged and locked in the engaged position by an ordinary padlock thus permitting disconnection of the coupling only by authorized persons provided with the padlock key. In another embodiment, the flanged guard member is engaged upon the U-shaped shackle of a padlock so the body of the lock serves as the retaining member.

5 Claims, 10 Drawing Figures

Patented July 25, 1972
3,678,717
3 Sheets-Sheet 1
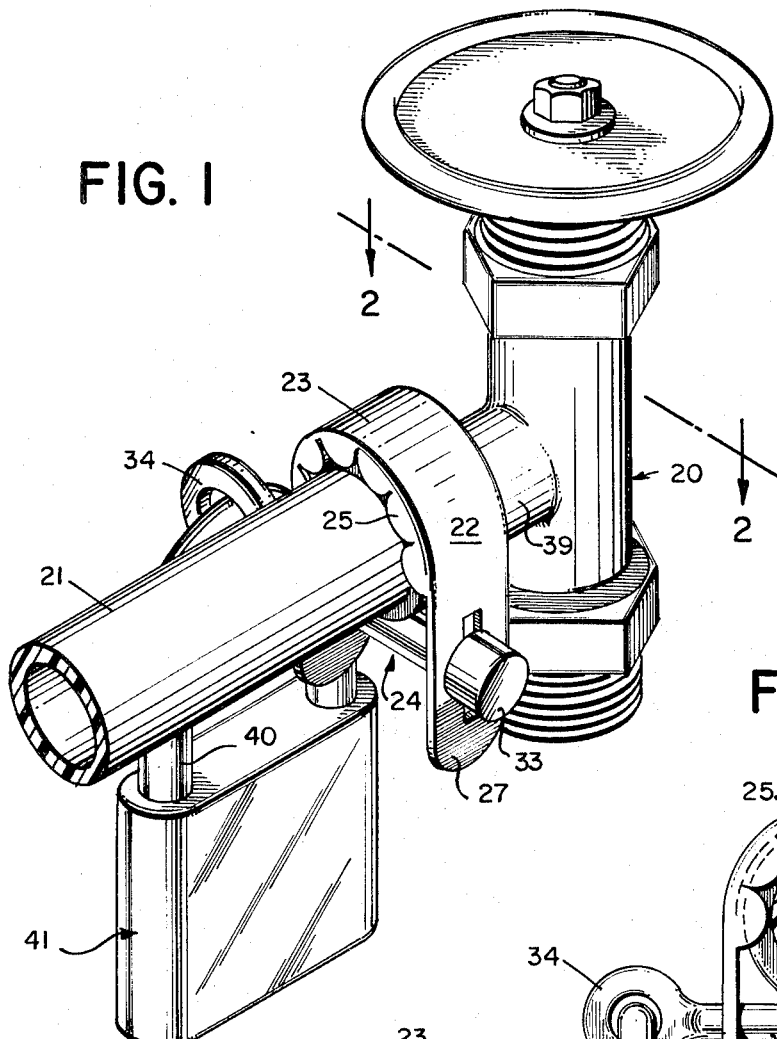
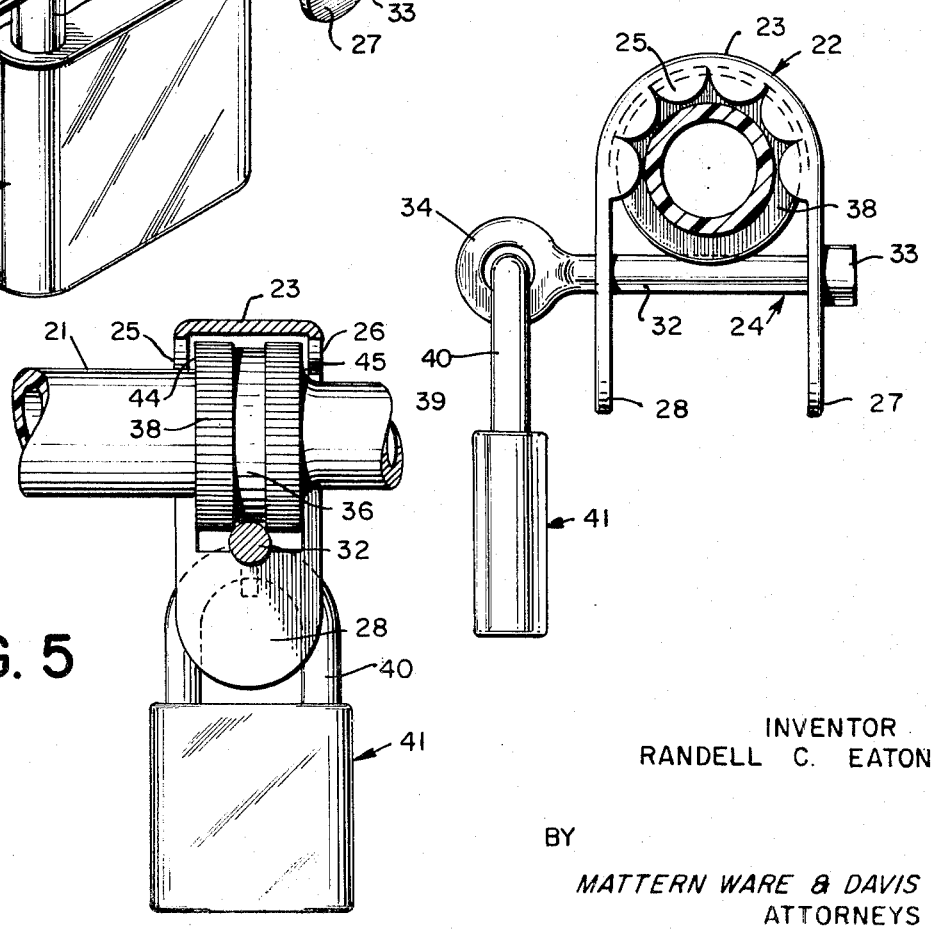
INVENTOR
RANDELL C. EATON
BY
MATTERN WARE & DAVIS
ATTORNEYS Patented July 25, 1972 3,678,717

Patented July 25, 1972

COUPLING GUARD DEVICE

SUMMARY OF THE INVENTION

In many locations, especially those open to the public, such as marinas, where yacht owners require a water source for cleaning, and golf courses, where large expanses of grass and flowers are maintained, a problem has resulted from the unwanted removal of garden hoses and sprinklers left unattended. This has resulted in a very costly and annoying task of replacing the stolen equipment.

Usually, the unwanted removal of this equipment is made by simply unscrewing the garden hose end from the permanently fixed faucet or pipe end. Until now, no device was available which could successfully render a hose coupling tamper proof and prevent unauthorized disengagement of the hose from the faucet.

Therefore, the principal object of this invention is to provide a coupling guard that is capable of preventing unauthorized disconnection of a hose coupling.

Another object of this invention is to provide a coupling guard capable of being secured in position by means of an ordinary padlock.

A further object of this invention is to provide a coupling guard which can be quickly assembled and disassembled only by authorized persons.

Another object of this invention is to provide a coupling guard which can be inexpensively manufactured.

A still further object of this invention is to provide a coupling guard that substantially surrounds, shields and retains a hose coupling.

Other objects of the invention will in part be obvious and will in part appear hereinafter.

THE DRAWINGS

FIG. 1 is a perspective view of the guard device according to this invention shown in its locked position embracing the hose coupling;

FIG. 4 is a front elevational view partially in cross section taken along line 2—2 of FIG. 3;

FIG. 5 is a side elevational view partially in cross section taken along line 5—5 of FIG. 3;

DETAILED DESCRIPTION

Figure 2:
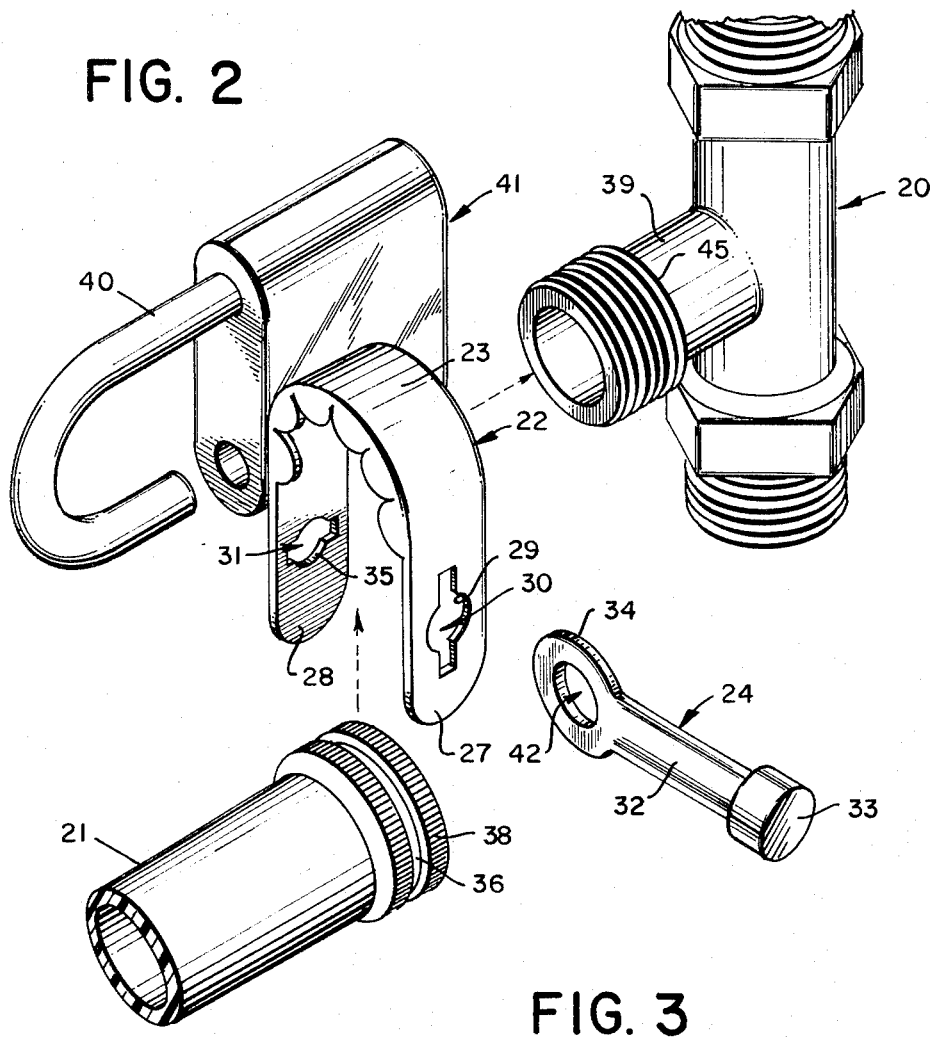
FIG. 2 is a perspective view showing the guard device according to this invention in its disassembled relation to a disconnected hose coupling.

In FIG. 1, valve assembly 20 and hose 21 are coupled and a disconnect prevention guard device according to the invention shown generally at 22 is mounted and locked into position.

The guard device 22 comprises a U-shaped guard member 23 and a retaining pin 24. The guard member 23 incorporates scalloped flanges 25 and 26 extending downwardly from the edges of its upper bight or arch portion and substantially parallel downwardly extended side legs 27 and 28.

As best shown in FIG. 2, side leg 27 is provided with a vertically extending key-slot 30 having an intermediate circular enlargement 29 and side leg 28 is provided with a similar horizontally extending key-slot 31 having an intermediate circular enlargement 35 axially aligned with the circular enlargement 29 of the key-slot 30. The retaining pin 24 is substantially in the form of an eyebolt and comprises a cylindrical shank 32 having an enlarged cylindrical head 33 at one end and a flat loop or ring 34 at its other end having a thickness substantially less than the diameter of the shank 32 and an external diameter substantially greater than the diameter of the shank. The dimensions of retaining pin 24 are such in relation to slots 30 and 31 that the ring 34 may pass freely through the slots, the shank 32 may have rotative engagement in the intermediate circular enlargements of the slots, and the head 33 may have abutting engagement with the outer side of the side leg of the guard member in surrounding relation to the circular enlargement of the slot in such side leg.

In normal use, the internally threaded connector ring 38 rotatably mounted on the end of the hose 21 is screwed on the externally threaded end of neck 39 of valve assembly 20. Once mounted, the hose coupling is unprotected and the hose easily removed. To prevent the unauthorized disconnection of the hose coupling, the guard member 23 is placed around the coupling to substantially embrace it, as shown in FIGS. 4 and 5. Pin 24 is then inserted into slot 30 of side leg 27 and through slot 31 of side leg 28, until the head 33 firmly abuts side leg 27. In moving between the key-slots 30 and 31, ring end 34 of pin 24 may be turned into a horizontal position to clear the hose coupling. In the fully engaged position shank 32 of pin 24 engages in the annular groove 36 in the connector ring 38, while its ring end 34 is turned into a vertical position to prevent its retraction through the horizontal key-slot 31. Once retaining pin 24 is in place, shackle 40 of lock 41 is slipped through the ring 34 and engaged in that position. With coupling guard 22 secured in place, unauthorized disconnection of the hose coupling is prevented.

Figure 3:
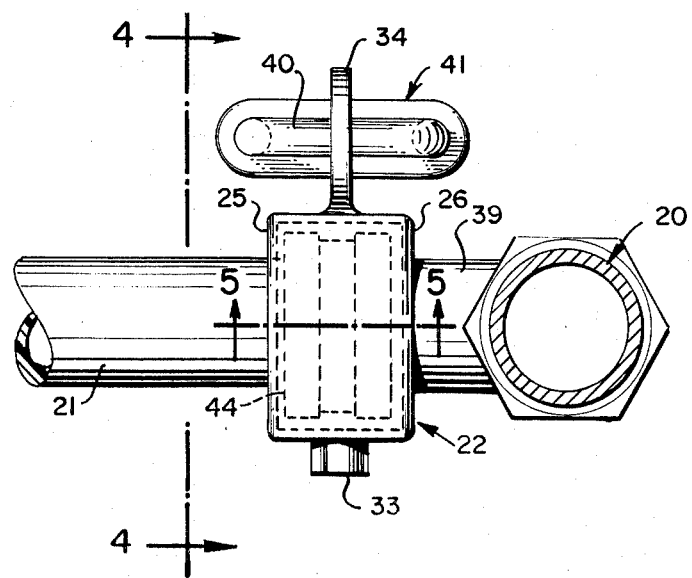
FIG. 3 is a top plan view of the apparatus of FIG. 1 partially in cross section taken along the line 2—2 of FIG. 1.

Now referring to FIGS. 3, 4 and 5, shank portion 32 of pin 24 is secured in supporting contact with rotatable connector ring 38 of hose 21. Since the guard member 23 surroundingly embraces the connector ring 38 and the shank portion 32 of pin 24 is in interlocked relation with the connector ring, one can see that the guard device cannot be moved in any manner that would allow access to the hose coupling.

Furthermore, flange 25 is in close proximity to hose 21 while flange 26 surroundingly embraces neck 39 of valve assembly 20. If any rotational movement of the connector ring 38 were successfully effectuated, only partial disconnection of the hose coupling would be possible. Connector ring 38 of hose 21 could only be rotated until its end surface 44 comes in contact with flange 25 while side 45 of neck 39 comes in contact with flange 26. Once this position is reached, further disconnection of the hose coupling becomes impossible. Easily installable coupling guard 22 not only surroundingly embraces the hose coupling, making it extremely difficult to obtain access to the coupling to achieve disconnecting rotation of the coupling, but also interlocks with the coupling in such manner as to eliminate any possibility for forced disconnection of the coupling without actual rotation of the connector ring.

Figure 6:
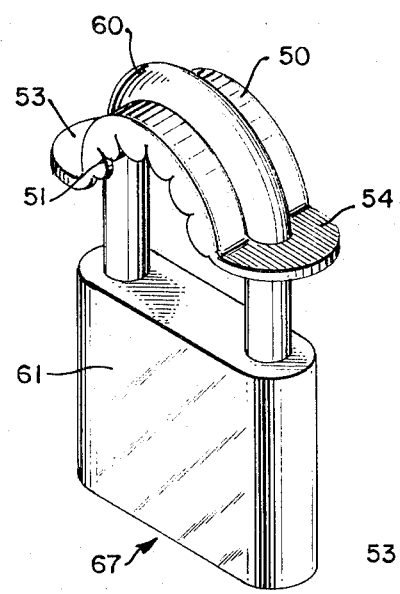
FIG. 6 is a perspective view of the guard device according to another embodiment of this invention shown incorporated with an ordinary padlock.
Figure 7:
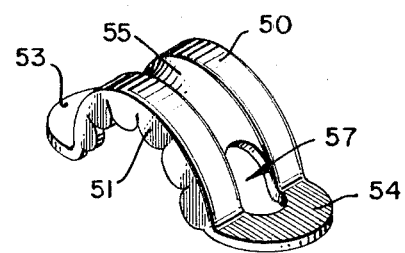
FIG. 7 is a perspective view of the guard device of FIG. 6.
Figure 8:
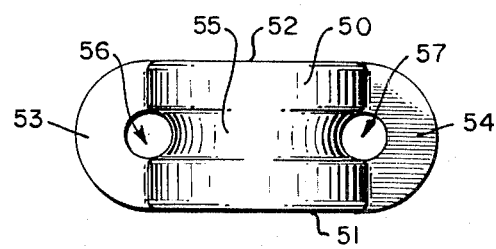
FIG. 8 is a top plan view of the guard device of FIG. 7.

Another embodiment of this invention is shown in FIGS. 6, 7, 8, 9 and 10. In this embodiment, an arched guard member 50 incorporates the scalloped flanges 51 and 52 along its edges and substantially lateral side ears 53 and 54 extending outwardly at its lower ends. A groove 55 extends along the arched member 50, terminating at holes 56 and 57 in the side ears, which extend partially into the ends of the groove 55 to allow arched member 50 to be easily mounted in cooperation with shackle 60 of lock 67, as shown in FIG. 6.

Figure 9:
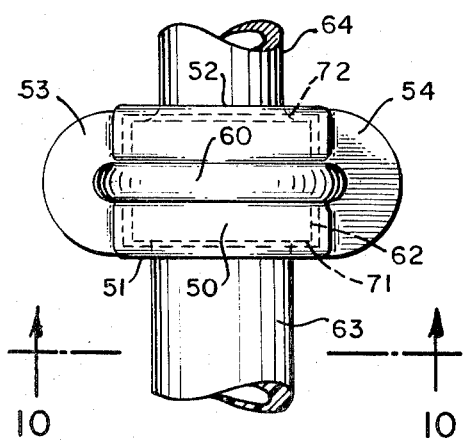
FIG. 9 is a top plan view of the apparatus of FIG. 6 in its engaged relation with a hose coupling.
Figure 10:
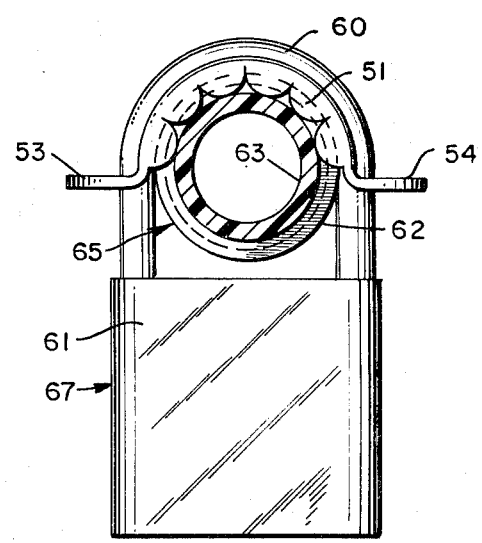
FIG. 10 is a front elevational view of the apparatus of FIG. 6 partially in cross section taken along line 10—10 of FIG. 9.

Now referring to FIGS. 9 and 10, this embodiment of the disconnect prevention guard is shown in its retaining position on the hose coupling 65. Rotatable connector ring 62 of hose 63 is engaged with the threaded portion of neck 64, forming coupling 65. Arched member 50 surroundingly embraces hose coupling 65, assuring its retention in that position.

Body portion 61 of lock 67 is in close proximity to rotatable connector ring 62 of hose 63 when lock 67 has been secured. The position of body portion 61 substantially reduces access to rotatable connector 62, thereby making disconnection of coupling 65 extremely difficult.

If, however, rotatable connector ring 62 of hose 63 was effectively manipulated to begin its disconnection, complete removal is precluded. Connector 62 can be rotated only until end surface 71 of connector ring 62 comes into restraining frictional contact with flange 51 while the radial surface 72 of neck 64 comes into restraining frictional contact with flange 52. Once this position is reached, further disconnection of hose coupling 65 is impossible.

Since the foregoing description and drawings are merely illustrative, the scope of the invention has been broadly stated herein and it should be liberally interpreted to secure the benefit of all equivalents to which the invention is fairly entitled.

I claim:

1. A disconnect prevention guard device for a coupling comprising:
   A. an arched guard member for substantially embracing said coupling comprising:
      a. a single sheet stamping arcuately bent for embracing said coupling, and
      b. scalloped retaining flanges disposed along the ends of said arcuate plate to prevent axial disengagement of said coupling;
   B. a retaining member
      a. cooperatively associated with said arched member for maintaining the embracing relationship to prevent disconnection of the embraced coupling, and
      b. detachably interconnected with said arched member to prevent disengagement of said embraced relationship; and
   C. locking means assuring disengagement of said embraced relationship only by authorized persons.

2. A disconnect prevention guard device for a coupling as defined in claim 1, wherein said arched member comprises substantially parallel extending sides which are slotted to receive said retaining member.

3. A disconnect prevention guard device for a coupling as defined in claim 2, wherein said retaining member is further defined as comprising a substantially circular rod incorporating an enlarged terminal flange and a substantially flat ring of metal forming the other terminating end which receives locking means that assure disengagement of said embraced relationship only by authorized persons.

4. A disconnect prevention guard device for a coupling comprising:
   A. an arched guard member for substantially embracing said coupling, comprising
      a. two radially extending sides, and
      b. a positioning groove formed within said arched member terminating with two retaining holes;
   B. a retaining member
      a. cooperatively associated with said arched member for maintaining the embracing relationship to prevent disconnection of the embraced coupling, and
      b. detachably interconnected with said arched member to prevent disengagement of said embraced relationship; and
   C. locking means assuring disengagement of said embraced relationship only by authorized persons.

5. A disconnect prevention guard device as defined in claim 4, wherein said retaining member comprises:
   a. a shackle for positioning in said groove and through said holes, and
   b. a body portion containing said locking means and lockingly engageable with said shackle for maintaining said embraced relationship.

* * * * *